United States Patent [19]

Abdo

[11] Patent Number: 4,816,538

[45] Date of Patent: Mar. 28, 1989

[54] NICKEL-CONTAINING HYDROCRACKING CATALYST

[75] Inventor: Suheil F. Abdo, Diamond Bar, Calif.

[73] Assignee: Union Oil Company of California, Los Angeles, Calif.

[21] Appl. No.: 81,472

[22] Filed: Aug. 4, 1987

Related U.S. Application Data

[63] Continuation-in-part of Ser. No. 74,294, Jul. 16, 1987.

[51] Int. Cl.$^4$ .......................... B01J 29/04; B01J 29/00
[52] U.S. Cl. .................................. 502/66; 502/213; 502/259; 502/207; 502/257
[58] Field of Search ................. 502/66, 213, 259, 207, 502/257

[56] References Cited

U.S. PATENT DOCUMENTS

| | | | |
|---|---|---|---|
| 3,781,199 | 12/1973 | Ward | 208/89 |
| 3,897,327 | 7/1975 | Ward | 208/111 |
| 3,929,672 | 12/1975 | Ward | 252/455 Z |
| 4,036,739 | 7/1977 | Ward | 208/120 |
| 4,268,420 | 5/1981 | Klotz | 502/207 |
| 4,405,502 | 9/1983 | Klotz | 502/257 |
| 4,458,024 | 7/1984 | Oleck et al. | 502/66 |
| 4,503,023 | 3/1985 | Breck et al. | 423/328 |
| 4,610,973 | 9/1986 | Ward | 502/66 |
| 4,642,176 | 2/1987 | Adams et al. | 208/111 |
| 4,672,048 | 6/1987 | Ward | 502/66 |
| 4,683,050 | 7/1987 | Ward | 502/66 |

FOREIGN PATENT DOCUMENTS 0124120 11/1984 European Pat. Off. .

*Primary Examiner*—Deborah Yee
*Attorney, Agent, or Firm*—Alan H. Thompson; Gregory F. Wirzbicki

[57] ABSTRACT

A process for producing a high octane gasoline from a hydrocarbon feedstock in which the feedstock is contacted in the presence of hydrogen under hydrocracking conditions, preferably ammonia-rich hydrocracking conditions, with a hydrocracking catalyst comprising at least one hydrogenation metal component in combination with a cracking component. The preferred cracking components are Y zeolites and the catalyst preferably contains a nickel hydrogenation metal component, particularly in an amount greater than 13 weight percent, calculated as NiO. The catalyst may also contain a Group VIB metal component, such as a molybdenum component, particularly in a mole ratio greater than about 2 to 1, calculated as NiO to Group VIB metal trioxide. It has been found that such a process produces gasoline fractions having substantially increased research and motor octane numbers.

29 Claims, No Drawings

NICKEL-CONTAINING HYDROCRACKING CATALYST

RELATED APPLICATIONS

This application is a continuation-in-part application of U.S. patent application Ser. No. 07/074294, filed July 16, 1987.

BACKGROUND OF THE INVENTION

This invention relates to a catalytic hydrocracking process and a catalyst for use therein. More particularly, the invention relates to a hydrocracking catalyst of improved properties for producing gasoline from gas oils and the like under hydrocracking conditions.

Petroleum refiners often produce desirable products such as middle distillate (or midbarrel) products, including turbine fuel and diesel fuel, as well as lower boiling products, such as naphtha and gasoline, by hydrocracking a hydrocarbon feedstock derived from a crude oil. Feedstocks most often subjected to hydrocracking include gas oils recovered as a fraction from a crude oil by distillation by coking and the like. The typical gas oil comprises a substantial proportion of hydrocarbon components boiling above about 400° F., usually at least about 60% by weight boiling above about 500° F.

Hydrocracking is generally accomplished by contacting, in an appropriate reactor vessel, the gas oil or other feedstock to be treated with a suitable hydrocracking catalyst under suitable conditions of elevated temperature and pressure in the presence of hydrogen so as to yield a distribution of hydrocarbon products required by (or satisfactory to) the refiner. Although the operating conditions within a hydrocracking reactor are of obvious importance in influencing the yield of product or products, the hydrocracking catalyst is of vital importance in this regard. Many catalysts are known for hydrocracking, but since their respective catalytic properties vary widely, it can be appreciated that hydrocracking catalysts having great usefulness for one purpose, as for example, for maximizing gasoline and naphtha production, are unsuitable for many other purposes, as for example, maximizing the yield of turbine fuel. And even among catalysts useful for producing the same product, the usefulness of each varies according to the requirements of the refiner. For example, hydrocracking catalysts having high activity for maximum gasoline production under typical hydrocracking conditions have proven inferior for more specific purposes, as for example, where a relatively large yield of gasoline of improved octane quality is desired.

Oftentimes refiners have resorted to using catalysts at relatively severe hydrocracking conditions to obtain sufficient yields of high octane quality gasoline. Also, gasoline octane quality has traditionally been improved with the addition of lead compounds to gasoline; however, recent environmental legislation has restricted such lead addition to the extent that refiners are searching for improved hydrocracking catalysts and processes in order to produce gasoline of high octane, thus minimizing the subsequent addition of octane improvers.

In the search for improved hydrocracking catalysts and processes that produce improved gasoline octane quality, the activity of the hydrocracking catalyst must also be considered. Activity may be determined by comparing the temperature at which various catalysts must be utilized under otherwise constant hydrocracking conditions with the same feedstock so as to produce a given percentage of hydrocarbon products boiling at or below a given temperature or to produce a hydrocarbon product having a given API gravity. The lower the temperature at which the catalyst must be utilized at the given conditions, the more active such a catalyst is for hydrocracking. Alternatively, when various catalysts are utilized under otherwise constant hydrocracking conditions with the same feedstock, activity may be determined by comparing the increase in percentage of hydrocarbon products boiling below a given temperature (for example hydrocarbon products boiling at or less than about 400° F.). The higher the percentage of hydrocarbon product boiling below a given temperature for a given catalyst, the more active such a catalyst is in relation to a catalyst yielding a lower percentage of hydrocarbon product boiling below the same given temperature.

Accordingly, the present invention is directed to a catalyst and catalytic hydrocracking process primarily of advantage in producing a gasoline of improved octane quality, and more particularly, in producing such gasoline without a major sacrifice in activity.

It is a major object of the invention to provide a catalytic hydrocracking process utilizing a hydrocracking catalyst of superior properties for producing a gasoline of improved octane quality from gas oils and the like. A more specific object of the invention is to provide a suitably active catalyst for use in a catalytic hydrocracking process for treating hydrocarbon feedstocks boiling primarily above 400° F. to produce a light and/or a heavy gasoline fraction of improved octane quality. These and other objects of the invention will become more apparent in view of the following description of the invention taken together with the Examples and claims.

SUMMARY OF THE INVENTION

In accordance with the invention, it has now been found that a hydrocarbon gasoline stream of increased octane number can be recovered from the effluent of a hydrocracking zone wherein a hydrocarbon feedstock is contacted with a hydrocracking catalyst comprising a cracking component and a hydrogenation metal component consisting essentially of a nickel component. The catalyst preferably contains greater than 13 weight percent of nickel, calculated as NiO. In another embodiment, the catalyst contains nickel and at least one Group VIB metal hydrogenation component in a mole ratio greater than 2 to 1, NiO to Group VIB metal trioxide. Prepare crystalline molecular sieves that are acidic forms of Y zeolites. It has been found that such hydrocracking catalysts are significantly more effective for increasing octane numbers than conventional hydrocracking catalysts, particularly when used in an ammonia-cracking rich hydrocracking environment.

DETAILED DESCRIPTION OF THE INVENTION

The present invention provides for a hydrocarbon conversion catalyst and its use, particularly in a process for producing a hydrocarbon product containing light and heavy gasoline fractions of improved octane quality. The catalyst contains at least one nickel hydrogenation component combined with at least one cracking component and may further contain at least one Group VIB metal component. As will be shown hereinafter in Example I, a cracking component combined with (1)

greater than 13 weight percent of a nickel component, calculated as NiO, (greater than 10.14 weight percent, calculated as Ni) or (2) nickel in combination with a Group VIB metal in a mole ratio greater than about 2 to 1 (NiO to Group VIB metal trioxide), proves superior for imparting octane boosting properties to the resulting catalyst as compared to conventional catalysts.

The catalyst contains at least one nickel hydrogenation component, such as the metal oxides or sulfides thereof, and typically in an amount from about 5 to about 35 weight percent and preferably between 13 and about 30 weight percent, calculated as NiO (i.e., about 3.9 to about 27.5, and preferably 10.14 to about 23.6, calculated as the metal, respectively). The catalyst may also contain one or more additional hydrogenation components, in particular, the metals, oxides and sulfides of the Group VIB elements, preferably tungsten and molybdenum, with the latter being most preferred. When Group VIB metals are not present, it is critical that the catalyst contain greater than 13 weight percent of nickel components, calculated as NiO, (i.e., greater than 10.14 weight percent nickel, calculated as Ni). When Group VIB metals are present, the catalyst preferably contains at least about 5 weight percent, and more preferably at least 13 weight percent of nickel components, calculated as NiO. The mole ratio of nickel components to the Group VIB components is at least about 2 to 1, and usually at least about 5 to 1, NiO to Group VIB metal trioxide.

The catalyst also contains a cracking component having sufficient acidity to impart activity for cracking a hydrocarbon oil. Suitable cracking components include silica-aluminas and crystalline molecular sieves having cracking activity Crystalline molecular sieves are preferred cracking components. The term "crystalline molecular sieve" as used herein refers to any crystalline cracking component capable of separating atoms or molecules based on their respective dimensions. Crystalline molecular sieves may be zeolitic or nonzeolitic. The term "nonzeolitic" as used herein refers to molecular sieves whose frameworks are not formed of substantially only silica and alumina tetrahedra. The term "zeolitic" as used herein refers to molecular sieves whose frameworks are formed of substantially only silica and alumina tetrahedra such as the framework present in ZSM-5 type zeolites, Y zeolites, and X zeolites. Examples of zeolitic crystalline molecular sieves which can be used as a cracking component of the catalyst include Y zeolite, fluorided Y zeolites, X zeolites, zeolite beta, zeolite L, mordenite and zeolite omega. Examples of non-zeolitic crystalline molecular sieves which may be used as a cracking component of the catalyst include silicoalumino-phosphates, aluminophosphates, ferrosilicates, titanium aluminosilicates, borosilicates and chromosilicates.

The most preferred zeolitic crystalline molecular sieves are crystalline aluminosilicate Y zeolites. U.S. Pat. No. 3,130,007, the disclosure of which is hereby incorporated by reference in its entirety, describes Y-type zeolites having an overall silica-to-alumina mole ratio between about 3.0 and about 6.0, with a typical Y zeolite having an overall silica-to-alumina mole ratio of about 5.0. It is also known that Y-type zeolites can be produced, normally by dealumination, having an overall silica-to-alumina mole ratio above 6.0. Thus, for purposes of this invention, a Y zeolite is one having the characteristic crystal structure of a Y zeolite, as indicated by the essential X-ray powder diffraction pattern of Y zeolite, and an overall silica-to-alumina mole ratio above 3.0, and includes Y-type zeolites having an overall silica-to-alumina mole ratio above about 6.0.

Typical Y zeolites in the sodium (or other alkali metal) form have few or no acid sites and, thus, have little or no cracking activity. The acidity of the Y zeolite may be increased by exchanging the sodium in the Y zeolite with ammonium ions, polyvalent metal cations, such as rate earth-containing cations, magnesium cations or calcium cations, or a combination of both, thereby lowering the sodium content. Such an ion-exchange may reduce the stability of the Y zeolite and (typically in the case of ammonium exchanges) the Y zeolite is then steam-treated at a high temperature (i.e., about 600° C. to about 800° C.) followed by further ion-exchange. For sufficient cracking activity, the sodium (or other alkali metal) content of the Y zeolite is generally reduced to less than about 1.0 weight percent, preferably less than about 0.5 weight percent and most preferably less than about 0.3 weight percent, calculated as $Na_2O$. Methods of carrying out the ion exchange are well known in the art.

A preferred Y zeolite is one prepared by first ammonium exchanging a Y zeolite to a sodium content between about 0.6 and 5 weight percent, calculated as $Na_2O$, calcining ammonium exchanged zeolite in the presence of at least 0.2 p.s.i. water vapor partial pressure at a temperature between 600° F. and 1,650° F. to reduce the unit cell size to a value in the range between 24.40 and 24.64 Angstroms, and then ammonium exchanging the zeolite once again to replace at least 25 percent of the residual sodium ions and obtain a zeolite product of less than 1.0 weight percent sodium and preferably less than 0.6 weight percent sodium, calculated as $Na_2O$. Such a Y zeolite is highly stable and maintains a high activity. The zeolite is described in detail in U.S. Pat. No. 3,929,672, the disclosure of which is hereby incorporated by reference in its entirety. A preferred member of this group is known as Y-82, a zeolitic aluminosilicate molecular sieve available from the Linde Division of the Union Carbide Corporation.

Another group of Y zeolites which may be used as a molecular sieve in the catalyst of the invention is comprised of zeolites normally having an overall silica-to-alumina mole ratio above about 6.0, preferably between about 6.1 and about 15. The zeolites of this group are prepared by dealuminating a Y-type zeolite having an overall silica-to-alumina mole ratio below about 6.0 and are described in detail in U.S. Pat. No. 4,503,023 issued to Breck et al., and European patent application No. 84104815.0 published on Nov. 7, 1984 as Publication No. 0 124 120 by Best et al., the disclosures of which are hereby incorporated by reference in their entireties. A preferred member of this group is known as LZ-210, a zeolitic aluminosilicate molecular sieve available from the Linde Division of the Union Carbide Corporation. LZ-210 zeolites and the other zeolites of this group are conveniently prepared from a Y zeolite starting material in overall silica-alumina mole ratios between about 6.0 and about 15, although higher ratios are possible. Preferred LZ-210 zeolites have an overall silica-to-alumina mole ratio of about 6.1 to about 13.0. Typically, the unit cell size is at or below 24.65 Angstroms and will normally range between about 24.20 and about 24.65 Angstroms. LZ-210 zeolites having an overall silica-to-alumina mole ratio below 20 generally have a sorptive capacity for water vapor at least 20 weight percent based on the anhydrous weight of the zeolite. Normally, the oxygen sorptive capacity at 100 mm mercury and −183° C. will be at least 25 weight percent. The LZ-210 class of zeolites have a composition expressed in terms of mole ratios of oxides as:

$$(0.85-1.1)M_{2/n}O : Al_2O_3 : xSiO_2$$

wherein "M" is a cation having the valence "n" and "x" has a value greater than 6.0.

In general, LZ-210 zeolites may be prepared by dealuminating Y-type zeolites using an aqueous solution of a fluorosilicate salt, preferably a solution of ammonium hexafluorosilicate. The dealumination is accomplished by placing a Y zeolite, normally an ammonium exchanged Y zeolite, into an aqueous reaction medium such as an aqueous solution of ammonium acetate, and slowly adding an aqueous solution of ammonium fluorosilicate. After the reaction is allowed proceed, a zeolite having an increased overall silica-to-alumina ratio is produced. The magnitude of the increase is dependent at least in part on the amount of fluorosilicate solution contacted with the zeolite and on the reaction time allowed. Normally, a reaction time of between about 10 and about 24 hours is sufficient for equilibrium to be achieved. The resulting solid product, which be separated from the aqueous reaction medium by conventional filtration techniques, is a form of LZ-210 zeolite. In some cases this product may be subjected to a steam calcination by contacting the product with water vapor at a partial pressure of at least 0.2 p.s.i.a. for a period of between about ¼ to about 3 hours at a temperature between 900° F. and about 1,500° F. in order to provide greater crystalline stability.

In addition to the zeolitic crystalline molecular sieves disclosed herein and used in the Examples, other example of cracking components that may be combined with metal hydrogenation components include non-crystalline acidic materials such as the silica-aluminas or silica-alumina dispersions described in U.S. Pat. No. 4,097,365, the disclosure of which is incorporated by reference in its entirety.

An example of non-zeolite crystalline molecular sieves also useful as a cracking component in the composition of the invention is a silicoaluminophosphate, known by the acronym "SAPO," described in detail in U.S. Pat. No. 4,440,871, the disclosure of which is hereby incorporated by reference in its entirety. Another useful class of nonzeolitic crystalline molecular sieves is generally referred to as crystalline aluminophosphates, designated by the acronym "AlPO4." The structure and preparation of the various species of aluminophosphates are discussed in U.S. Pat. Nos. 4,310,330 and 4,473,663, the disclosures of which are hereby incorporated by reference in their entirety. Yet another class of nonzeolitic molecular sieves suitable for use is known as ferrosilicates, designated by the acronym "FeSO." A preferred ferrosilicate denominated as FeSO-38 is disclosed in European patent application No. 83220068.0 filed on Oct. 12, 1982 and published on May 16, 1984 as Publication No. 0 108 271 A2, the disclosure of which application is hereby incorporated by reference in its entirety. Still other examples of non-zeolitic sieves include rosilicates, chromosilicates and crystalline silicas. Borosilicates are described in U.S. Pat. Nos. 4,254,247, 4,264,813 and 4,327,236, the disclosures of which are hereby incorporated by reference in their entireties. Chromosilicates are described in detail in U.S. Pat. No. 4,405,502, the disclosure of which is also hereby incorporated by reference in its entirety. A preferred crystalline silica, essentially free of aluminum and other Group IIIA metals, is a silica polymorph, i.e., silicalite, which may be prepared by methods described in U.S. Pat. No. 4,061,724, the disclosure of which is hereby incorporated by reference in its entirety.

The cracking component may be combined with a binder or matrix material comprising a porous, inorganic refractory oxide component or a clay component having essentially no cracking activity. To prepare a catalyst, the cracking component is combined with the porous, inorganic refractory oxide component, or a precursor thereof, such as alumina, silica, titania, magnesia, zirconia, borilia, silica-magnesia, silica-titania, other such combinations and the like, with alumina being the most highly preferred. Examples of precursors that may be used include peptized alumina, alumina gel, hydrated alumina, and silica sols. Normally, the porous, inorganic refractory oxide component or its precursor is mixed or comulled with a cracking component in amounts such that the final dry catalyst mixture will comprise (1) between about 5 weight percent and about 85 weight percent cracking component, preferably between about 15 weight percent and about 80 weight percent, and (2) between about 2 weight percent and about 75 weight percent of porous, inorganic refractory oxide, preferably between about 5 weight percent and about 60 weight percent. The comulled mixture is then formed into particulates, usually by extrusion through a die having openings of a cross sectional size and shape desired in the final catalyst particles. For example, the die may have openings therein in the shape of three-leaf clovers so as to produce an extrudate material similar to that shown in FIGS. 8 and 8A of U.S Pat. No. 4,028,227, the disclosure of which is hereby incorporated by reference in its entirety. Among preferred shapes for the die openings are those that result in particles having surface-to-volume ratios greater than about 100 reciprocal inches. After extrusion, the catalyst particles are cut into lengths of from 1/16 to ½ inch. The resulting particles are subjected to a calcination at an elevated temperature, normally between about 600° F. and about 1600° F., to produce catalytic particles of high crushing strength.

As will be shown hereinafter in the Examples, comparisons with nickel and nickel-Group VIB metal catalysts indicate that the best octane improvements occur in the absence of Group VIB metal. On the other hand, the best activity occurs when Group VIB metal is present. Present indications are that Group VIB metal functions to increase activity, with, at most, a small sacrifice in octane value—and in some cases, with an improvement in octane values, as compared to catalysts containing only nickel as an active hydrogenation metal. When Group VIB metals are present in the catalyst, the activity is effectively improved when nickel and Group VIB metals are contained in a mole ratio greater than about 5 to 1, preferably greater than about 9 to 1, more preferably greater than about 17 to 1, and most preferably greater than about 25 to 1 (NiO to Group VIB metal trioxide). A mole ratio from about 9:1 to about 60:1 is highly preferred. Nevertheless, at present, the best results insofar as octane improvement is concerned have been with catalysts containing at least one nickel component and no Group VIB metals. Accordingly, a presently preferred catalyst for maximum octane improvement comprises a hydrogenation metal consisting essentially of one or more nickel components on a support comprising a cracking component. A highly preferred catalyst comprises a hydrogenation metal consisting essentially of greater than 13 weight percent of one or more nickel components, calculated as NiO, on a support containing a zeolitic aluminosilicate molecular sieve known as Y-82. Another highly preferred catalyst comprises a hydrogenation metal consisting essentially of at least 13 weight percent of one or more nickel components, calculated baas NiO, and containing a Y-type zeolite known as LZ-210. Of course, more active embodiments of such highly preferred catalysts further contain one or more Group VIB metal components, particularly molybdenum components, in the mole ratios to nickel hereinbefore set forth. For instance, highly preferred nickel-Group VIB catalysts, containing about 15 weight percent of nickel components, calculated as NiO, and about 0.5 to about 3.0 weight percent of molybdenum components, calculated as $MoO_3$, in combination with a cracking component, will contain nickel and molybdenum metals in the preferred mole ratios. As stated above, such catalysts provide increased activity with, at most, some sacrifice in the octane value of the gasoline.

Although nickel and other hydrogenation components may be supplied from essentially any source thereof, suitable inorganic compounds for use herein include nickel nitrate, nickel acetate, nickel carbonate, nickel oxide, ammonium heptamolybdate, molybdic trioxide, ammonium metatungstate, and the like. Organometallic compounds may be utilized such as cyclopentadienyl or carbonyl nickel compounds.

The nickel or other hydrogenation components may be impregnated into the extruded catalyst particles from a liquid solution containing the desired component. Another method of combining the hydrogenation metals with the cracking component is by mulling or co-mulling hydrogenation metal compounds with the cracking components and binding materials. In a preferred embodiment, the extruded particles containing cracking components are impregnated with an aqueous solution containing dissolved nickel components.

The hydrogenation components, which will largely be present in their oxide forms after calcination in air, may be converted to their sulfide forms, if desired, by contact at elevated temperatures in a reducing gas atmosphere comprising hydrogen sulfide. Most commonly, the sulfiding is accomplished in situ, as by placing the catalyst in its oxide form in the reactor vessel wherein the hydrocracking reactions are to be performed and then passing a mixture of hydrogen and hydrogen sulfide or hydrogen and carbon disulfide through the catalyst bed under conditions of elevated temperature. Alternatively, the catalyst may be placed in the reactor vessel and then contacted, under hydrocracking conditions and in the presence of a sulfur component, with the hydrocarbon feedstock to be catalytically converted to lower boiling hydrocarbons. The sulfur component may be an organosulfur component present in the feedstock, or it may be hydrogen sulfide added from an external source. Alternatively still, the hydrogen sulfide may accompany the feedstock itself, as would be the case, for example, if the hydrocracking operation is performed immediately after hydrotreating. These and other equivalent methods for activating the catalyst by conversion to the sulfide form may be utilized in the invention.

The catalyst may be employed in any of several hydrocarbon conversion processes wherein catalytic compositions containing active metals on a support material are known to be catalytically effective. Typical processes include dehydrogenation, desulfurization, hydrodesulfurization, denitrogenation, demetallization, isomerization, hydroisomerization, hydrocracking, hydrodewaxing, reforming, and the like, with hydrocracking being preferred. It is preferred that the catalyst contact a hydrocarbon feedstock in the presence of hydrogen.

The term "hydrocarbon conversion" refers to any reaction wherein a hydrocarbon compound changes chemical composition. As used herein, "hydrocarbon" which consists of hydrogen and carbon, and "hydrocompound carbon feedstock" or "hydrocarbon feed" refers to any charge stock which contains greater than about 90 weight percent carbon and hydrogen, calculated as the elements. Especially preferred feedstocks include gas oils and feedstocks containing normal paraffins.

The hydrocarbon conversion conditions employed to convert a hydrocarbon feedstock will vary widely depending upon the process in which the catalyst is used, the nature of the feed, and the desired product. Most usually, the catalyst is maintained as a fixed bed with the feedstock containing a hydrocarbon compound passing downwardly therethrough, and the reactor is generally operated under conditions which convert the feedstock into a desired product containing at least one chemically-changed derivative form of the hydrocarbon compound of the feedstock. Operating conditions include a temperature from about 50° F. to about 1,000° F., a pressure from atmospheric to about 4,000 p.s.i.g., and a space velocity of about 0.05 to about 25 (LHSV). It is preferred that the hydrocarbon conversion conditions include the presence of added free hydrogen, with said conditions including a hydrogen recycle rate usually about 1,000 to about 15,000, and preferably about 3,000 to about 10,000 standard cubic feet per barrel (scf/bbl).

The catalyst disclosed herein is particularly useful for hydrocracking a hydrocarbon oil containing hydrocarbons and/or other organic materials to a product containing hydrocarbons and/or other organic materials of lower average boiling point and lower average molecular weight. The hydrocarbon feedstocks that may be subjected to hydrocracking by the method of the invention include all mineral oils and synthetic oils (e.g., shale oil, tar sand products, etc.) and fractions thereof. Illustrative hydrocarbon feedstocks include those containing components boiling above 550° F., such as atmospheric gas oils, vacuum gas oils, deasphalted vacuum and atmospheric residua, hydrotreated residual oils, coker distillates, cycle oils, and catcracker distillates. A preferred hydrocracking feedstock is a gas oil or other hydrocarbon fraction having at least 50% by weight, and most usually at least 75% by weight, of its components boiling at temperatures above the end point of the desired product, which end point, in the case of heavy gasoline, is generally in the range from about 380° F. to about 420° F. The most useful gas oil feedstock will contain hydrocarbon components boiling above about 550° F. (that is, more than about 25 volume percent boils above 550° F.) with highly useful results being achieved with feeds containing at least 25 percent by volume of components boiling between 600° F. and 1,000° F.

Also, included are petroleum distillates wherein at least 90 percent of the components boil in the range from about 300° F. to about 800° F. The petroleum distillates may be treated to produce both light gasoline fractions (boiling range, for example, from about 50° F. to about 185° F.) and heavy gasoline fractions (boiling range, for example, from about 185° F. to about 400° F.).

The process of the invention is most preferably utilized in conjunction with a catalytic hydrotreating operation. That is, the feedstock to be subjected to hydrocracking in the process of the invention most usually comprises, and more usually still consists essentially of, the entire effluent from a catalytic hydrotreater wherein, in the presence of a hydrotreating catalyst usually comprising Group VIII and VIB metal components on a porous non-cracking refractory oxide, such as a sulfided catalyst containing nickel and/or cobalt components plus molybdenum and/or tungsten components on alumina, the sulfur and nitrogen components in a hydrocarbon-containing liquid are converted by reaction with hydrogen at elevated temperatures and pressures to hydrogen sulfide and ammonia, respectively. In the preferred method of operation, therefore, hydrotreating will precede hydrocracking, and thus, the feedstock most usually subjected to hydrocracking in the process of the present invention will be a hydrotreated feedstock, such as a hydrotreated gas oil or a hydrotreated cycle oil. Such a hydrotreated feedstock typically contains organonitrogen compounds in a concentration in the range from about 0.1 to about 500 ppmw, usually less than 100 ppmw, and preferably less than about 10 ppmw, calculated as N, and contains organosulfur compounds in a concentration less than about 500 ppmw, usually less than 100 ppmw, and preferably between about 1 and 75 ppmw, calculated as S.

Although all or a portion of the effluent from a hydrocarbon-containing stream passed through a hydrotreating zone is passed through a hydrocracking zone containing the catalyst of the invention, the process of the invention is not limited to this particular flow scheme. For example, in another embodiment of the invention, two separate hydrocracking zones may be utilized in series in one reactor, or two or more reactors, with one zone containing the catalyst of the invention and the other(s) containing the same or a different hydrocracking catalyst. Because of the combined presence of nickel and the cracking component in one of the catalysts, octane numbers of both light gasoline and heavy gasoline fractions are increased in the products obtained from a hydrocarbon feed that passes through the reactor.

In the process of the invention, the hydrocracking conditions are adjusted so as to obtain a substantial degree of cracking per pass of hydrocarbon feed over the catalyst. Usually, the cracking per pass is such as to convert a significant portion, ordinarily at least 30% by volume, preferably at least 35% by volume, of the hydrocarbon-containing components boiling above about 400° F. to hydrocarbon products boiling below about 400° F. Under preferred cracking conditions, and with a typical gas oil, the product distribution is such that, of the products boiling at a temperature less than about 400° F., the gasoline product boiling between 50° F. and the end point of a typical gasoline fraction (i.e., about 185° F.) and the gasoline product boiling between about 185° F. and the end point of a typical heavy gasoline fraction (i.e., about 400° F.) both may comprise significant proportions.

The exact conditions, of course, required to produce a desired result in any given hydrocarbon conversion process will depend primarily on the feedstock and the desired product, with the boiling point characteristics of the feedstock and desired product being particularly important factors in determining the conditions of operation. In general, however, the conditions of operation for hydrocracking gas oil feedstocks and the like in the process of the invention will fall into the following ranges:

TABLE I

|  | Suitable | Preferred |
|---|---|---|
| Temperature, °F. | 450–950 | 500–800 |
| Pressure, p.s.i.g. | 500–3,500 | 1,000–3,000 |
| LHSV | 0.1–10.0 | 0.5–3.0 |
| H$_2$/Oil, MSCF/bbl | 1–10 | 2–8 |

Typical reactions involving hydrocarbon compounds of the feed which occurs under the above-mentioned conditions include the conversion of cyclic compounds to aliphatic compounds. For instance, alicyclic, aromatic and/or heterocyclic compounds are converted to straight- or branchedchain paraffin compounds. Also, long chained aliphatic compounds are converted to shorter chain compounds. The yield of C$_4$ to 400° F. gasoline is usually at least about 50 percent and preferably at least about 70 percent by volume on a once-through basis. Although it is contemplated that the hydrocracking process of the invention may be carried out on a once-through basis, with collection of unconverted feed components, it is sometimes more desirable and preferable to operate with recycle of unconverted feed components boiling above the maximum desired product end point.

The hydrocracking catalysts described above are much more effective for increasing the octane quality of gasoline than conventional hydrocracking catalysts in the presence of ammonia. It is a preferred embodiment of the invention, therefore, to use the catalyst in a hydrocracking zone under ammonia-rich hydrocracking conditions. The phrase "ammonia-rich" as used herein refers to the situation where there is more than 100 ppmw ammonia, based on the feedstock, present in the hydrocracking zone. As the ammonia concentration is increased, it generally causes more deactivation of hydrocracking catalysts, but the present catalysts (nickel only or nickel-Group VIB versions) remain active and provide gasoline of increased octane value even when the ammonia is present in the hydrocracking zone in a concentration greater than 200 ppmw and even when greater than 1,000 ppmw. In a preferred embodiment of the hydrocracking process of the invention in which only one hydrocracking zone is utilized in series with, and a downstream of, a hydrotreating zone, the feed to the hydrocracking zone will not be treated to remove the ammonia produced in the hydrotreating zone below 200 ppmw. In another embodiment in which two hydrocracking zones are in series downstream of a hydrotreating zone, such as the process described in U.S. Pat. No. 4,565,621, the disclosure of which is hereby incorporated by reference in its entirety, the catalyst will normally be used in the first hydrocracking zone which directly receives the ammonia-containing effluent from the hydrotreating zone. Since ammonia is removed from the process by water scrubbing. the effluent from the first hydrocracking zone before the unconverted portion of the effluent is passed to the second hydrocracking zone, the second hydrocracking zone has an essentially ammonia-free hydrocracking atmosphere in which there is normally no more than about 50 ppmw ammonia, based on the feedstock, present.

In the hydrocracking process of the invention, the effluents from one or more hydrocracking zones are subjected to distillation to separate the lower boiling fractions from the higher boiling fractions which are recycled to the last hydrocracking zone. A light gasoline fraction boiling in the range between about 50° F. and about 185° F. is removed from the distillation column along with a heavier gasoline fraction boiling in the range between about 185° F. and about 400° F. (Operation with recycle under ideal conditions converts the 400+° F. fraction to extinction, i.e., a 100% conversion to products boiling below the maximum desired temperature of the product. More usually, however, one must operate with a bleed of unconverted feed components, resulting in a conversion over 90% but not quite to extinction.) In conventional hydrocracking processes, the light gasoline fraction is usually blended into the final gasoline product; however, it is sometimes passed downstream where it is subjected to isomerization to increase its research and motor octane numbers so that the fraction can be more effectively used in gasoline blending. The heavier gasoline fraction, which will normally have research and motor octane numbers somewhere in the 40's to low 60's, is typically subjected to reforming to increase the octane numbers to values which would enable the reformed fractions to be directly used in gasoline blending. By employing the process of the invention in which the hydrocracking catalysts disclosed herein are used in at least one hydrocracking zone, the motor and research octane numbers of the resultant light gasoline fraction will typically be sufficiently high to allow the fraction to be used directly as a gasoline blending fraction, thus reducing the need for expensive isomerization. Moreover, the heavy gasoline fraction produced in such a process will possess increased research and motor octane numbers. This means that the reformer can be operated under less severe conditions to obtain the desired octane number increase while decreasing the loss of volume yield which would be incurred at the more severe reforming conditions than would otherwise be required Alternatively, the reformer can be operated at a constant volume yield and an increased product octane is obtained.

An advantage of the catalyst employed herein is that its properties allow a petroleum refiner to also employ the catalyst in a downstream isomerization process such as the hydroisomerization of normal paraffins, particularly n-pentane and n-hexane compounds, to produce high yields of paraffin isomers. An exemplary isomerization process involves isomerizing the components of a light gasoline fraction to effect an increase in motor and research octane numbers. In such processes, the catalyst is employed under isomerizing conditions and often in the presence of sulfur impurities in the feedstock. Typically the catalyst is employed to isomerize a feedstock containing aliphatic hydrocarbons (particularly paraffins) and organosulfur compounds at a temperature in the range from about 50° F. to about 575° F. and a pressure from atmospheric to about 500 p.s.i.g. in the presence of hydrogen to produce a hydrocarbon product containing essentially no sulfur and an inincreased yield of paraffin isomer compounds compared to the feedstock. More specifically, a catalyst comprising a hydrogenation metal component consisting essentially of nickel components and a Y zeolite such as LZ-210 may be contacted by a light gasoline feedstock containing sulfur, n-pentane and/or n-hexane in a reactor operated at about 450° F. to about 575° F. and a pressure in the range from about 200 p.s.i.g. to about 350 p.s.i.g. to produce a hydrocarbon product containing essentially no sulfur, but containing $C_5$ and/or $C_6$ branched isomer compounds in a concentration greater than that in the feedstock. Consequently the hydrocarbon product has an octane number greater than that of the feedstock. The property of the catalyst composition of the present invention, with respect to simultaneously desulfurizing and isomerizing a hydrocarboncontaining oil, is further disclosed in co-pendng U.S. patent application Ser. No. 074,294, filed July 16, 1987, Dr. Suheil F. Abdop and Peter Kokayeff, entitled "Desulfurization and Isomerization of n-Paraffins," the disclosure of which application is hereby incorporated by reference in its entirety.

The invention is further illustrated by the following examples which are illustrative of specific modes of practicing the invention and are not intended as limiting the scope of the invention defined by the appended claims.

EXAMPLE I

A blend of hydrotreated and partially hydrocracked gas oil having the chemical and physical properties shown in the following Table II:

TABLE II

| Gas Oil Characteristics | | | |
|---|---|---|---|
| Distillation Vol. % | °F. | | |
| IBP/5 | 325/402 | Gravity, °API | 38.5 |
| 10/20 | 410/425 | Sulfur, XRF, ppmw | ~0.1 |
| 30/40 | 468/500 | Nitrogen, ppmw | ~0.1 |
| 50/60 | 532/561 | | |
| 70/80 | 591/623 | | |
| 90/95 | 665/705 | Total Aromatics, vol. % | 25.6 |
| EP/% Rec. | 768/98.9 | | | is passed in fourteen runs (runs 1 through 14) on a once-through basis through an isotermal reactor vessel containing a sample of catalyst particles. Operating conditions are as follows: 1.7 LHSV, 1,450 p.s.i.g., a once-through hydrogen flow of 8,000 scf/bbl. The temperature of the reactor is adjusted in runs 8 through 14 to convert the feedstock to a product having an API gravity of 47.0° (i.e., about 40 volume percent conversion of feed components to products). In addition, tert-butyl amine and thiophene are added to the reactor in runs 8 through 14 in amounts commensurate with the amounts of $NH_3$ and $H_2S$, respectively, that would be present in the entire effluent from hydrotreating the gas oil blend from which the feedstock of Table II was derived, i.e., hydrocracking is simulated in an $H_2S$ and $NH_3$-containing atmosphere providing a gas oil containing about 0.5% by weight sulfur and 0.2 by weight of nitrogen (i.e., an ammonia-rich feedstock). To simulate hydrocracking in a $H_2S$-containing atmosphere, thiophene, but no tert-butyl amine, is added to the reactor in runs 1 through 7 (i.e., an ammonia-deficient feedstock) and the temperature is adjusted to convert the feedstock to a product having an API gravity of 49.5° (i.e., about 55 volume percent conversion of feed to product components). Thus, the conditions under which the catalysts are tested simulate those one would expect to pertain in a hydrocracking vessel employed in an integral hydrotreating-hydrocracking operation wherein the entire effluent from the hydrotreater, plus added hydrogen, is passed to the hydrocracker for further refinement. In this case, conversion is primarily to a light and heavy gasoline product. (In this simulation, the crack per pass metatungstate. All the impregnated particulates are dried, calcined and sulfided in an identical manner.

TABLE III

| | Run No./Cat. | Composition | | | | Relative Activity, °F.[1,2] | Light Gasoline[5] Octane Number | | Heavy Gasoline[6] Octane Number | |
|---|---|---|---|---|---|---|---|---|---|---|
| | | Metals, wt. % | | Mole Ratio NiO/MO₃ *** | Support | | | | | |
| | | NiO | Group VIB | | Zeolite (SiO₂/Al₂O₃) | | Research[3] | Motor[4] | Research[3] | Motor[4] |
| NH₃ Def. | 1 Cat R | 5.0 | 15.0* | 0.64 | Y-82 (5.8) | Ref | 84.1 | 81.8 | 60.6 | 61.9 |
| | 2 Cat A | 15.0 | — | — | Y-82 (5.8) | Ref + 20 | 85.6 | 83.1 | 62.2 | 64.2 |
| | 3 Cat B | 15.0 | 3.0* | 9.6 | Y-82 (5.8) | Ref + 4 | 84.3 | 80.2 | 61.5 | 59.8 |
| | 4 Cat D | 5.0 | — | — | Y-82 (5.8) | Ref + 30 | 83.3 | 80.1 | 64.2 | 63.7 |
| | 5 Cat C | 15.0 | — | — | LZ-210 (9.0) | Ref + 42 | 83.4 | 80.1 | 54.4 | 56.0 |
| | 6 Cat E | 15.0 | — | — | LZ-210 (6.5) | Ref + 13 | 84.9 | 80.2 | 64.0 | 62.8 |
| | 7 Cat F | 4.0 | 22.0** | 0.56 | LZ-210 (9.0) | Ref + 24 | 86.9 | 82.3 | 56.7 | 57.2 |
| NH₃ Rich | 8 Cat R | 5.0 | 15.0* | 0.64 | Y-82 (5.8) | Ref | 80.8 | 78.7 | 59.1 | 59.0 |
| | 9 Cat A | 15.0 | — | — | Y-82 (5.8) | Ref + 3 | 85.9 | 82.4 | 63.9 | 63.8 |
| | 10 Cat B | 15.0 | 3.0* | 9.6 | Y-82 (5.8) | Ref + 1 | 82.0 | 78.5 | 62.6 | 61.5 |
| | 11 Cat D | 5.0 | — | — | Y-82 (5.8) | Ref + 11 | 84.4 | 80.1 | 64.8 | 63.0 |
| | 12 Cat C | 15.0 | — | — | LZ-210 (9.0) | Ref + 4 | 85.3 | 81.6 | 64.5 | 58.8 |
| | 13 Cat E | 15.0 | — | — | LZ-210 (6.5) | Ref + 8 | 85.1 | 81.4 | 65.6 | 62.8 |
| | 14 Cat F | 4.0 | 22.0** | 0.56 | LZ-210 (9.0) | Ref − 16 | 81.3 | 79.0 | 56.7 | 57.2 |

[1]The activity data indicate the relative operating temp. after 100 hrs. of run for runs 1-7 to obtain a product having an API Gravity of 49.5°.
[2]The activity data indicate the relative operating temp. after 80 hrs. of run for runs 8-14 to obtain a product having an API Gravity of 47.0°.
[3]Octane numbers determined according to ASTM method D2699.
[4]Octane numbers determined according to ASTM method D2700.
[5]Light gasoline boiling range is 50° F. to 185° F.
[6]Heavy gasoline boiling range is 185° F. to 400° F.
*Molybdenum, calculated as MoO₃
**Tungsten, calculated as WO₃
***M denotes Mo or W (i.e., MoO₃ or WO₃)

in the hydrocracking zone itself, as stated above, is about 55 vol. % in runs 1 through 7 and 40 vol. % in runs 8 through 14; but the overall crack per pass through the integral hydrotreating-hydrocracking system, based on the unhydrotreated feedstock, is 60 vol. %.)

The compositions of the catalysts tested in accordance with the foregoing procedure are specified in Table III. As shown, each of the catalysts (conventional catalysts R, F, and D and catalysts of the invention A, B, C and E) contains nickel or nickel plus molybdenum active components, and the supports of the catalysts contain the same proportion of one of two stabilized zeolites, one being LZ-210, a proprietary zeolite of Union Carbide, and the second, a stabilized Y zeolite, Y-82, prepared in accordance with the method of U.S. Pat. No. 3,929,672 herein incorporated by reference in its entirety. The two zeolites may be distinguished from each other at least by their silica-to-alumina ratios. The stabilized Y zeolite, Y-82, is hydrophillic and has a silica-to-alumina mole ratio about 5.8. The LZ-210 zeolites have a silica-to-alumina mole ratio higher than that of Y-82, that is, about 6.5 and 9.0.

In addition to containing one of the two specified zeolites, the catalysts set forth in Table III are further composed of an alumina binder material.

Each of the foregoing catalysts is prepared by co-mulling the zeolites with an alumina hydrogel. The comulled paste is extruded in particulate form having a cross-sectional cylindrical shape. The particulates, of a length between about ¼ and ½ inch, are dried and calcined in air. The particulates are ten impregnated with an aqueous solution of nickel nitrate in an amount sufficient to produce final Catalysts A, C, D and E having the weight percent set forth in Table III. In preparing Catalysts R and B, an aqueous solution containing ammonium heptamolybdate and nickel nitrate is used to impregnate the particulates. Conventional Catalyst F is prepared by impregnating the particles with an aqueous solution containing nickel nitrathe and ammonium The data in Table III show that Catalysts A and B of the invention (containing Y-82 zeolite) exhibit octane boosting properties as compared to conventional Catalysts R and D. Also, Catalyst B, having a NiO/MoO₃ mole ratio greater than 2 to 1, demonstrates an activity advantage over Catalyst A and, under ammonia-rich conditions, demonstrates octane boosting properties over Catalyst R and about equivalent to Catalyst R under ammonia-deficient conditions. Furthermore, Catalysts C and E of the invention (containing LZ-210 zeolite) exhibit octane boosting properties as compared to conventional Catalyst F.

The data obtained from the runs indicate that a catalyst containing a zeolite Y-82 support and a hydrogenation metal consisting essentially of a nickel component (such as Catalyst A) exhibits a superiority over Catalyst R in increasing the octane numbers of both light and heavy gasoline products obtained from the feedstock under both ammonia-rich and ammonia-deficient conditions. For instance, the octane numbers of the light gasoline fraction are from 3.7 to 5.1 numbers higher in run no. 9 (Catalyst A) than run no. 8 (conventional Catalyst R containing 5 NiO, 15 MoO₃ supported on Y-82 zeolite) under ammonia-rich conditions. Also, the octane numbers of the heavy gasoline fraction are about 4.8 numbers higher in run no. 9 vs. run no. 8. Such boosts in the octane rating in run no. 9 vs. run no. 8 are observed while the activity of Catalyst A is 3° F. less under ammonia-rich conditions. Under the ammonia-deficient conditions of run nos. 1 and 2, Catalyst A exhibits an octane increase from 1.3 to 1.5 numbers for light gasolines and from 1.6 to 2.3 for heavy gasolines compared to Catalyst R.

Furthermore, when LZ-210 is used in Catalyst C of the invention, the octane numbers are also improved significantly in run no. 12 vs. run no. 14, i.e., from 2.6 to 4.0 numbers higher than conventional Catalyst F (containing nickel and nickel on LZ-210) for light gasoline fractions and 1.6 to 7.8 numbers higher for heavy gasoline fractions under ammonia-rich conditions. Moreover, when the silica-to-alumina ratio of LZ-210 is decreased from 9.0 (in Catalyst C) to 6.5 (in Catalyst E), the octane number improvement for heavy gasoline fractions by Catalyst E vs. Catalyst F (run no. 13 vs. run no. 14) is even greater than Catalyst C vs. Catalyst F under ammonia-rich conditions of run no. 13 vs. run no. 12. Under ammonia-deficient conditions (run no. 6 vs. run nos. 5 or 7), Catalyst E also provides a substantial improvement of 7.3 to 9.6 research octane numbers and 5.6 to 6.8 motor octane numbers for heavy gasoline fractions over Catalyst C or F and is more active by 29° F. and 11° F., respectively.

When the catalyst contains a cracking component and one or more hydrogenation components consisting essentially of more than 13 weight percent of nickel, calculated as NiO, the octane numbers of the light gasoline fraction are consistently higher than those for a catalyst containing the same cracking component and a hydrogenation component consisting essentially of lesser amounts of nickel. The comparison of run no. 2 vs. run no. 4 and the comparison of run no. 9 vs. run no. 11 demonstrathe such results in both ammonia-rich and ammonia-deficient conditions. Catalyst A (containing Y-82 zeolite and consisting essentially of 15 weight percent of nickel, as NiO) exhibits an improvement over Catalyst D (containing Y-82 zeolite and consisting essentially of 5 weight percent of nickel, as NiO) of 2.3 to 3.0 numbers (run no. 2 vs. run no. 4) and 1.5 to 2.3 numbers (run no. 9 vs. run no. 11) for light gasoline fractions. It is clear from the data that a catalyst containing relatively large amounts of nickel components, i.e., greater than 13 weight percent, and preferably greater than about 14 weight percent, calculated as NiO, provides an unusual improvement in gasoline octane quality as compared to the same catalyst containing less than 13 weight percent of nickel, as NiO.

The data from the runs also indicathe that a NiO/MoO$_3$ mole ratio greater than 2 to 1 in the catalyst of the invention provides improved octane numbers for both light and heavy gasoline fractions. Under ammonia-rich conditions, the octane numbers of the light and heavy gasoline fractions obtained from run no. 10 (using Catalyst B having 15 NiO and 3 MoO$_3$, i.e., NiO/MoO$_3$ mole ratio of 9.6 to 1) are typically higher than those obtained from run no. 8 (using Catalyst R having 5 NiO and 15 MoO$_3$, Ni/MoO$_3$ mole ratio of 0.64 to 1), i.e., an improvement up to 1.2 numbers for light gasoline fractions and up to 3.5 numbers for heavy gasoline fractions (run. no. 10 vs. run no. 8). Furthermore in the comparison of Catalyst B vs. Catalyst A (containing no molybdenum), the data further show that the octane numbers of the light and heavy gasoline fractions obtained from run no. 9 (Catalyst A) are consisthently higher than those obtained from run no. 10 (Catalyst B) and the activity nearly equivalent, i.e., under ammonia-rich conditions an improvement of 3.3 to 3.9 numbers for light gasoline fractions and 1.3 to 2.3 numbers for heavy gasoline fractions (run no. 9 vs. run no. 10). Also, Catalyst A is only 2° F. less active than Catalyst B. On the other hand, under ammonia-deficient conditions, Catalyst A exhibits an improvement of 1.3 to 2.9 numbers for light gasoline fractions and 0.7 to 4.4 numbers for heavy gasoline fractions vs. Catalyst B (see run no. 3 vs run no. 2); however, Catalyst A is about 16° F. less active than Catalyst B under such ammonia-deficient conditions. The data obtained from the experiment indicathe that Catalyst B of the invention (having a NiO/MoO$_3$ mole ratio of 9.6 to 1) is useful for boosting octane and has an activity advantage over the catalysts containing no molybdenum; however, under suitable conditions, Catalyst A of the invention can outperform Catalyst B in increasing octane values in the gasoline product.

EXAMPLE II

Another blend of hydrotreated and partially hydrocracked gas oil having the chemical and physical properties shown in Table IV:

TABLE IV

| Gas Oil Characteristics | | | |
|---|---|---|---|
| Distillation Vol. % | °F. | | |
| IBP/5 | 234/363 | Gravity, °API | 35.7 |
| 10/20 | 369/388 | Sulfur, XRF, ppmw | ~0.1 |
| 30/40 | 401/450 | Nitrogen, ppmw | ~0.1 |
| 50/60 | 579/614 | | |
| 70/80 | 665/714 | | |
| 90/95 | 760/795 | Total Aromatics, vol. % | 20.9 |
| EP/% Rec. | 850/99.1 | | | is passed in then runs (runs 15 through 24) in the same manner as disclosed in Example I. Runs 15 through 19 are operated in the same manner as runs 1 through 7 in Example I, with runs 20 through 24 operated in the same manner as runs 8 through 14 in Example I.

The compositions of the catalysts thested are specified in Table V. Catalysts R and A are prepared in the same manner as in Example I and contain the same nominal compositions. Catalyst G is prepared in the same manner as Catalyst B in Example I, except a smaller portion of ammonium heptamolybdathe is mixed with the other matherials and the final nominal composition of Catalyst B contains 1.0 weight percent of molybdenum, calculated as MoO$_3$. Catalysts L and FA are prepared in the same manner as respective Catalysts C and F in Example I, except the LZ-210 has a silica-to-alumina ratio of 12.

TABLE V

| | Run No./Cat. | Composition | | | | | Relative Activity, °F.[1,2] | Light Gasoline[5] Octane Number | | Heavy Gasoline[6] Octane Number | |
|---|---|---|---|---|---|---|---|---|---|---|---|
| | | Metals, wt. % | | Mole Ratio NiO/MO$_3$ *** | Support | | | | | | |
| | | NiO | Group VIB | | Zeolite(SiO$_2$/Al$_2$O$_3$) | | | Research[3] | Motor[4] | Research[3] | Motor[4] |
| NH$_3$ Def. | 15 Cat R | 5.0 | 15.0* | 0.64 | Y-82 | (5.8) | Ref | 83.1 | 81.5 | 53.1 | 57.1 |
| | 16 Cat A | 15.0 | — | — | Y-82 | (5.8) | Ref + 35 | 84.5 | 81.9 | 58.0 | 61.1 |
| | 17 Cat G | 15.0 | 1.0* | 28.9 | Y-82 | (5.8) | Ref + 15 | 85.1 | 82.4 | 57.7 | 59.5 |
| | 18 Cat L | 15.0 | — | — | LZ-210 | (12) | Ref + 54 | 85.2 | 83.0 | 59.3 | 61.1 |
| | 19 Cat FA | 4.0 | 22.0** | 0.56 | LZ-210 | (12) | Ref + 22 | 83.3 | 81.6 | 56.2 | 58.2 |
| NH$_3$ Rich | 20 Cat R | 5.0 | 15.0* | 0.64 | Y-82 | (5.8) | Ref | 81.0 | 79.1 | 50.6 | 54.6 |
| | 21 Cat A | 15.0 | — | — | Y-82 | (5.8) | Ref + 11 | 83.8 | 80.8 | 55.1 | 59.1 |
| | 22 Cat G | 15.0 | 1.0* | 28.9 | Y-82 | (5.8) | Ref + 6 | 84.1 | 81.6 | 56.0 | 58.8 |
| | 23 Cat L | 15.0 | — | — | LZ-210 | (12) | Ref + 6 | 83.5 | 80.9 | 55.9 | 59.0 |

TABLE V-continued

| | Composition | | | | Relative | Light Gasoline[5] | | Heavy Gasoline[6] | |
| | Metals, wt. % | | Mole Ratio | | Activity, | Octane Number | | Octane Number | |
| Run No./Cat. | NiO | Group VIB | NiO/MO$_3$ *** | Support Zeolite(SiO$_2$/Al$_2$O$_3$) | °F.[1,2] | Research[3] | Motor[4] | Research[3] | Motor[4] |
|---|---|---|---|---|---|---|---|---|---|
| 24 Cat FA | 4.0 | 22.0** | 0.56 | LZ-210 (12) | Ref − 14 | 80.3 | 78.7 | 49.0 | 52.7 |

[1]The activity data indicate the relative operating temp. after 100 hrs. of run for runs 15–19 to obtain a product having an API Gravity of 49.5°.
[2]The activity data indicate the relative operating temp. after 80 hrs. of run for runs 20–24 to obtain a product having an API Gravity of 47.0°.
[3]Octane numbers determined according to ASTM method D2699.
[4]Octane numbers determined according to ASTM method D2700.
[5]Light gasoline boiling range is 50° F. to 185° F.
[6]Heavy gasoline boiling range is 185° F. to 400° F.
*Molybdenum, calculated as MoO$_3$
**Tungsten, Tungsten, calculated as WO$_3$
***M denotes Mo or W (i.e., MoO$_3$ or WO$_3$)

The data in Table V show that Catalysts A and G of the invention exhibit octane boosting properties compared to conventional Catalyst R. Also, Catalyst G, having a NiO/MoO$_3$ mole ratio of the metals greater than 2 to 1, demonstrathes an activity advantage over Catalyst A and, under both ammonia-rich and ammonia-deficient conditions, demonstrathes octane boosting properties over Catalyst R. Furthermore, Catalyst L of the invention exhibits octane boosting properties as compared to conventional Catalyst FA.

The data obtained from the runs in Table V indicathe that Catalyst A (containing nickel and no molybdenum) continues to maintain its superiority over conventional Catalyst R for increasing the octane numbers of light gasoline products obtained from a similar feedstock to that in Example I. For instance, in comparing run nos. 16 and 21 (Catalyst A) to run nos. 15 and 20 (Catalyst R), respectively, the octane numbers of the light gasoline fraction are greater by up to 2.8 numbers for Catalyst A than for Catalyst R and for the heavy gasoline fraction are greater by up to 4.9 numbers. However, the activity of Catalyst A relative to Catalyst R declines by 35° F. in run no. 16 vs. run no. 15 and by 11° F. in run no. 21 vs. run no. 20.

Catalyst G (containing nickel and only 1.0 weight percent of molybdenum, i.e. NiO/MoO$_3$ mole ratio of 28.9) also exhibits a superiority over Catalyst R in increasing the octane numbers of both light and heavy gasoline fractions. For instance, the octane numbers of the light gasoline fraction are up to 2.0 and 3.1 numbers higher in run nos. 17 and 22 (vs. run nos. 15 and 20, respectively) and the octane numbers of the heavy gasoline fraction are up to 4.6 and 5.4 numbers higher.

The data in Table V also indicathe that Catalyst G exhibits a superiority in activity and at least maintains, or in some cases improves, the octane numbers of gasoline products obtained from the feedstock as compared to a catalyst (Catalyst A) containing a cracking component and a hydrogenation component consisting essentially of nickel components. For instance, the octane numbers of the light gasoline fraction are from 0.5 to 0.6 numbers higher in run no. 17 (Catalyst G) than run no. 16 (Catalyst A) and 0.3 to 0.8 higher in run no. 22 than run no. 21.

Catalyst G also exhibits a substantial activity advantage compared to Catalyst A. The activity for Catalyst G in run no. 17 is only 15° F. less than Catalyst R whereas Catalyst A exhibits a 35° F. decline in run no. 16. However, unlike the runs in Example I, this time the nickel-only catalyst (Catalyst A) and the nickel-molybdenum catalyst (Catalyst G) are about equal for boosting octane. Furthermore, under ammonia-rich conditions, Catalyst G exhibits an activity advantage of 5° F. (compared to Catalyst A) in the comparison of run no. 22 vs. run no. 21. Thus, the data obtained from the experiment indicathe that, although Catalyst A of the invention is useful for improving octane, Catalyst G of the invention is useful for improving octane and is also far more active for converting gas oil feedstocks to gasoline.

Both Catalyst L and conventional Catalyst FA contain supports having an LZ-210 zeolite with a silica-to-alumina ratio of 12.0. Catalyst L (containing nickel) provides a consistent boost in both research and motor octane numbers compared to conventional Catalyst FA (containing nickel and tungsthen). The comparison of run no. 18 vs. run no. 19 under ammonia-deficient conditions and run no. 23 vs. run no. 24 under ammonia-rich conditions illustrathes that Catalyst L improves the octane quality of the products from 1.6 to 3.1 numbers under ammonia-deficient conditions and from 2.2 to 6.9 numbers under ammonia-rich conditions.

Thus, the data for the experiment indicathe that Catalysts A and L of the invention have superior octane boosting properties (compared to respective Catalysts R and FA) provided by the presence on the catalysts of only nickel components (at least 13 weight percent, NiO) in combination with Y-82 and LZ-210 cracking components, respectively. Furthermore, the data indicathe that the nickel-molybdenum Catalyst G, is more active than the nickel-only version (Catalyst A) and still exhibits octane boosting properties compared to a conventional nickel-molybdenum catalyst (Catalyst R).

In view of the foregoing description of the invention including the examples thereof, it is evident that many althernatives, modifications, and variations can be made by those skilled in the art without departing from the concept of the present invention. For instance, the catalyst may be employed in other hydrocarbon conversion processes, such as for hydrodewaxing or isomerizing a feedstock containing hydrocarbon compounds. Accordingly, it is intended in the invention to embrace all such alternatives, modifications, and variations as may fall within the scope of the appended claims.

I claim:

1. A catalytic composition comprising a cracking component and a hydrogenation metal component consisting essentially of greater than 13 weight percent of nickel components, calculated as NiO.

2. The composition defined in claim 1 further comprising a porous refractory oxide support, and wherein said cracking component contains a crystalline molecular sieve and said catalytic composition contains no catalytically active metal other than nickel.

3. The composition defined in claim 1 wherein said cracking component is a zeolitic crystalline molecular sieve selected from the group consisting of ZSM-5 zeolite, Y zeolite, X zeolite, zeolite beta, mordenithe, zeolite L and zeolite omega.

4. The composition defined in claim 1 wherein said cracking component is a Y zeolite and said hydrogenation metal component consists essentially of about 14 to about 35 weight percent of said nickel components, calculated as NiO.

5. The composition defined in claim 4 wherein said Y zeolite contains a mole ratio of oxides according to the formula $(0.85-1.1)M_{2/n}O: Al_2O_3\ xSiO_2$ wherein M is a cation having the valence n and x has a value greater than 6.0.

6. The composition defined in claim 5 wherein said Y zeolite is prepared by dealuminating a Y zeolite having an overall silica-to-alumina mole ratio below about 6.0 using an aqueous solution of a fluorosilicathe salt.

7. The composition defined in claim 4 wherein said Y zeolite is prepared by a method comprising the stheps of:
(1) calcining an ammonium-exchanged zeolite Y containing between about 0.6 and 5 weight percent sodium, calculated as $Na_2O$ at a themperature between about 600° F. and 1650° F. in contact with wather vapor for a sufficient time to substantially reduce the unit cell size of said zeolite and bring it to a value between about 24.40 and 24.64 angstroms; and
(2) subjecting the calcined zeolite to further ammonium ion exchange under conditions such that the sodium conthent of the zeolite is reduced below about 0.6 weight percent, calculated as $Na_2O$.

8. The composition defined in claim 1 wherein said cracking component is a nonzeolitic crystalline molecular sieve selected from the group consisting of silicoaluminophosphathes, aluminophosphathes, ferrosilicathes, borosilicathes, chromosilicathes and silica-aluminas.

9. The composition defined in claim 1 further comprising a porous refractory oxide support and wherein said catalytic composition contains no supported metals other than nickel.

10. The composition defined in claim 5 wherein x has a value between 6.0 and 9.0.

11. A catalytic composition comprising a cracking component and at least two hydrogenation metal components consisting essentially of nickel and Group VIB metal components in a mole ratio greater than about 9 to 1, calculated as NiO to Group VIB metal trioxide.

12. The composition defined in claim 11 wherein said cracking component is a crystalline molecular sieve.

13. The composition defined in claim 11 wherein said mole ratio is greater than about 25 to 1.

14. The composition defined in claim 12 wherein said crystalline molecular sieve is zeolitic and is selected from the group consisting of ZSM-5 zeolite, Y zeolite, X zeolite, zeolite beta, mordenithe, zeolite L and zeolite omega.

15. The composition defined in claim 14 wherein said cracking component is a Y zeolite.

16. The composition defined in claim 15 wherein said Y zeolite contains a mole ratio of oxides according to the formula $(0.85-1.1)M_{2/n}O:Al_2O_3\ xSiO_2$ wherein M is a cation having the valence n and x has a value greater than 6.0.

17. The composition defined in claim 16 wherein said Y zeolite is prepared by dealuminating a Y zeolite having an overall silica-to-alumina mole ratio below about 6.0 using an aqueous solution of a fluorosilicathe salt.

18. The composition defined in claim 14 wherein said Y zeolite is prepared by a method comprising the stheps of:
(1) calcining an ammonium-exchanged zeolite Y containing between about 0.5 and 5 weight percent sodium, calculated as $Na_2O$ at a themperature between about 600° F. and 1650° F. in contact with wather vapor for a sufficient time to substantially reduce the unit cell size of said zeolite and bring it to a value between about 24.40 and 24.64 angstroms; and
(2) subjecting the calcined zeolite to further ammonium ion exchange under conditions such that the sodium conthent of the zeolite is reduced below about 0.6 weight percent, calculated as $Na_2O$.

19. The composition defined in claim 11 wherein said cracking component is a nonzeolitic crystalline molecular sieve selected from the group consisting of silicoaluminophosphathes, aluminophosphathes, ferrosilicathes, borosilicathes, chromosilicathes and silica-aluminas.

20. The composition defined in claim 11 wherein said mole ratio is greater than about 17 to 1.

21. The composition defined in claim 11 wherein said mole ratio is in the range from about 9 to 1 to about 60 to 1.

22. The composition defined in claim 11 wherein said two hydrogenation metal components consist essentially of about 5 to about 50 weight percent of said nickel components, calculated as NiO, and about 0.05 to about 3.0 weight percent of molybdenum components, calculated as $MoO_3$.

23. The composition defined in claim 11 wherein said two hydrogenation metal components consist essentially of about 14 to about 35 weight percent of said nickel components, calculated as NiO, and about 0.05 to about 3.0 weight percent of molybdenum components, calculated as $MoO_3$.

24. The composition defined in claim 16 wherein x has a value between 6.0 and 15.

25. A catalytic composition comprising a hydrogenation metal component consisting essentially of greater than 13 weight percent of nickel components, calculated as NiO, supported on a porous refractory oxide containing a Y zeolite having a mole ratio of oxides according to the formula $(0.85-1.1)M_{2/n}O:Al_2O_3:xSiO_2$ wherein M is a cation having the valence n and x has a value greater than 9.0, and wherein said catalytic composition contains no hydrogenation metals other than nickel.

26. The composition defined in claim 25 wherein said Y zeolite is prepared by dealuminating a Y zeolite having an overall silica-to-alumina mole ratio below about 6.0 using an aqueous solution of a fluorosilicathe salt.

27. The composition defined in claim 26 wherein said hydrogenation metal component consists essentially of greater than 14 to about 35 weight percent of said nickel components, calculated as NiO, and said composition contains no supported metals other than nickel.

28. A catalytic composition comprising (1) a hydrogenation metal component consisting essentially of greater than 13 weight percent of nickel components, calculated as NiO, and (2) a porous refractory oxide support containing a Y zeolite prepared by a method comprising the stheps of:
(a) calcining an ammonium-exchanged zeolite Y containing between about 0.6 and 5 weight percent sodium, calculated as $Na_2O$ at a themperature between about 600° F. and 1650° F. in contact with wather vapor for a sufficient time to substantially reduce the unit cell size of said zeolite and bring it to a value between about 24.40 and 24.64 angstroms, and (b) subjecting the calcined zeolite to further ammonium ion exchange under conditions such that the sodium conthent of the zeolite is reduced below about 0.6 weight percent, calculated as $Na_2O$; and wherein said catalytic composition contains no supported metals other than nickel.

29. The composition defined in claim 28 wherein said hydrogenation metal consists essentially of about 14 to about 35 weight percent of said nickel components, calculated as NiO, and said catalytic composition contains no catalytically active metal other than nickel.

* * * * *

UNITED STATES PATENT AND TRADEMARK OFFICE
CERTIFICATE OF CORRECTION

PATENT NO. : 4,816,538

DATED : 03/28/89

INVENTOR(S) : Suheil F. Abdo

It is certified that error appears in the above-identified patent and that said Letters Patent is hereby corrected as shown below:

Col. 19, line 1, claim 3, delete "mordenithe" and insert -- mordenite --.

Col. 19, line 16, claim 6, delete "fluorosilicathe" and insert -- fluorosilicate --.

Col. 19, line 18, claim 7, delete "stheps" and insert -- steps --; line 24, delete "wather" and insert -- water --.

Col. 19, lines 35 and 36, claim 8, delete "silicoaluminophosphathes, aluminophosphathes, ferrosilicathes, borosilicathes, chromosilicathes" and insert -- silicoaluminophosphates, aluminophosphates, ferrosilicates, borosilicates, chromosilicates --.

Col. 19, line 56, claim 14, delete "mordenithe" and insert -- mordenite --.

Col. 19, line 68, claim 17, delete "fluorosilicathe" and insert -- fluorosilicate --.

UNITED STATES PATENT AND TRADEMARK OFFICE
CERTIFICATE OF CORRECTION

PATENT NO. : 4,816,538

DATED : 03/28/89

INVENTOR(S) : Suheil F. Abdo

It is certified that error appears in the above-identified patent and that said Letters Patent is hereby corrected as shown below:

Col. 20, line 2, claim 18, delete "stheps" and insert -- steps --;
line 8, delete "wather" and insert -- water --.

Col. 20, lines 19 and 20, claim 19, delete "silicoaluminophosphathes, aluminophosphathes, ferrosilicathes, borosilicathes, chromosilicathes" and insert -- silicoaluminophosphates, aluminophosphates, ferrosilicates, borosilicates, chromosilicates --.

Col. 20, line 65, claim 28, delete "stheps" and insert -- steps --.

Col. 21, line 2, claim 28, delete "wather" and insert -- water --.

Signed and Sealed this

Seventeenth Day of July, 1990

Attest:

HARRY F. MANBECK, JR.

*Attesting Officer*

Commissioner of Patents and Trademarks